Figure 1:
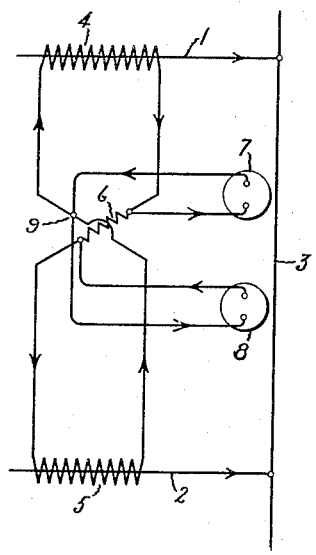

E. B. WEDMORE.
PROTECTIVE MEANS FOR ALTERNATING CURRENT DISTRIBUTION SYSTEMS.
APPLICATION FILED DEC. 24, 1915.

1,201,661.   Patented Oct. 17, 1916.

Inventor:
Edmund B. Wedmore,
by *Albert G. Davis*
His Attorney.

UNITED STATES PATENT OFFICE.

EDMUND BASIL WEDMORE, OF GOLDERS GREEN, ENGLAND, ASSIGNOR TO GENERAL ELECTRIC COMPANY, A CORPORATION OF NEW YORK.

PROTECTIVE MEANS FOR ALTERNATING-CURRENT-DISTRIBUTION SYSTEMS.

1,201,661.     Specification of Letters Patent.     Patented Oct. 17, 1916.

Application filed December 24, 1915. Serial No. 68,492.

*To all whom it may concern:*

Be it known that I, EDMUND B. WEDMORE, a subject of the King of Great Britain, residing at Golders Green, England, have invented certain new and useful Improvements in Protective Means for Alternating-Current-Distribution Systems, of which the following is a specification.

My present invention relates to the protection of alternating current distribution systems and its principal object is to provide improved apparatus for disconnecting a portion of the system in the event of a fault to earth or between phases in the system, or portion of the system protected by the apparatus.

One well known method of protecting alternating current systems which has heretofore been employed consists in connecting, in parallel feeders, current transformers, the secondary windings of which are interconnected and provided with reverse current relays, each of which controls a particular feeder. The current coils in the relays are normally so connected that they receive no current, but upon the occurrence of a fault the relay controlling the faulty conductor will operate to disconnect the same. The disadvantage of this particular arrangement is that the relays are apt to operate on ordinary unbalancing of the currents in the feeders due to conditions which may arise in the normal operation of the system and which cannot be easily avoided. The current which may flow through the relays under such conditions may be sufficient to cause operation of the relays when it is undesirable that they should operate. If, for example, a short circuit occurs at some point in the system beyond that fed by the parallel feeders, the current flowing to the short circuit is divided between the two feeders but should not cause the disconnection of either of them. To avoid the disconnection of either feeder under these conditions it has been customary to set the relays so that they will not operate by reason of ordinary unbalancing which may be as great as 5% with the maximum current which can flow in the system, this current being limited by the feeder impedance and the short-circuit capacity of the generating plant. For example, under such conditions the current flowing through two 100 ampere feeders may become as great as 10,000 amperes in each, so that an unbalancing of 5% would correspond to 500 amperes, and in such a case it would be necessary to set the relay so that it would not operate on 500 amperes unbalancing. When the relays are set in this way, they will not operate unless the fault current is great enough to produce an unbalancing of over 500 amperes or 500% of the normal current.

In carrying my invention into effect I provide means for giving the reverse current relays a normal bias against operation so that they will not operate to disconnect the feeder unless the unbalancing exceeds a predetermined percentage of the current carried by one of the feeders. Thus in the case above mentioned if a bias of 10% were given to the relays they would be so arranged that they would not tend to operate until the unbalancing exceeded 10% of the current in one feeder. With a load of 100 amperes the relays would tend to operate when the unbalanced current exceeded 10 amperes, while with a 10,000 ampere fault current flowing in each feeder the relays would not be operative unless the unbalancing exceeded 1000 amperes. Such an arrangement would be ample to cover any normal unbalancing of the current and at the same time would not prevent the operation of the relay in case the fault should occur in one of the feeders to which they are connected as in such a case the unbalanced current would exceed 10% of the normal current.

My invention will best be understood by reference to the following description taken in connection with the accompanying drawing in which—

Figure 2:
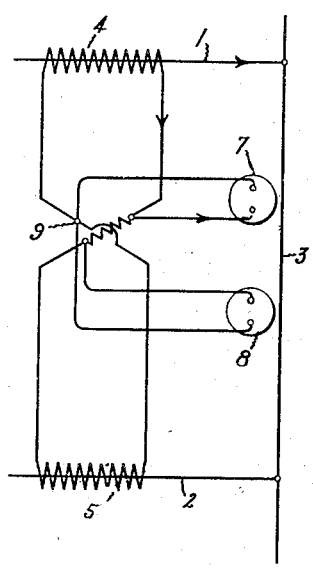
Figure 3:
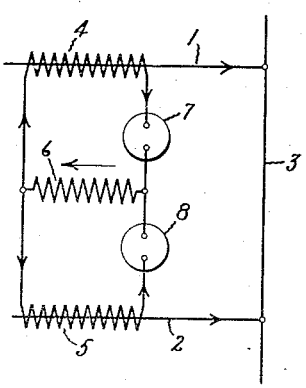
Figure 4:
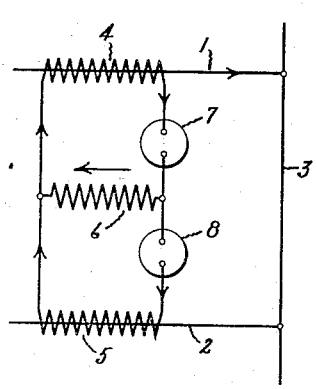

Figure 1 shows diagrammatically a system of connections which may be used in carrying my invention into effect; Fig. 2 shows the same system when the currents become unbalanced sufficiently to operate the relays; and Figs. 3 and 4 show a modification of the arrangement shown in Figs. 1 and 2.

As indicated in Fig. 1, the feeders 1 and 2 which, for simplicity of illustration, are indicated as single lines but which may be either two or three phase feeders, are assumed to be feeding the bus bar 3. The supply station is assumed to be on the left of the figure and the bus bar may be that of a substation, consumers installation or the like. The feeders 1 and 2 are protected at the receiving end by means of a circulating current system with reverse current relays. Current transformer 4 is connected in the first feeder and a similar current transformer 5 is connected in the second feeder and the secondaries of the two transformers are connected together to form a circulating current system.

It has heretofore been customary to connect reverse current relays to equipotential points in such a circulating system so that normally no current will flow through the relays. When the currents in the two feeders become unbalanced, however, the points at which the relays are connected are no longer at equal potentials and current will flow through the relays causing the desired relay to operate and disconnect the faulty feeder. When, however, the relays are connected in this way the disadvantage which has been previously mentioned is present. In order to overcome this disadvantage I provide an impedance 6 in the circulating system and connect the relays 7 and 8 between the opposite ends of this impedance and the point 9. Another point in the system whose potential would be equal to that of the point 9 would be situated at the middle of the impedance 6. There will normally be a drop of potential across impedance 6 and the direction of the current flow through the relays 7 and 8 will be as indicated by arrows. The direction of the current flow, however, is normally opposite to that which causes the relays to operate. If now a fault occurs in feeder 2, for example, the current flowing through the primary of transformer 5 will gradually diminish and if the fault becomes serious current will feed back from the bus bars in the opposite direction. In case the two feeders normally carry equal currents the primary of transformer 5 will now be taking more current than the primary of transformer 4 so that the equipotential point with respect to 9 of impedance 6, which with normal unbalancing moves one way or the other within the terminals of the impedance, now leaves the impedance altogether and the current through the relay 8 reverses as indicated by the arrows in Fig. 2. A stronger current will now be flowing through relay 7, but this relay was originally set to be inoperative on a current flowing in this direction. On account of the displacement of the equipotential point the current through relay 8 first decreases and then reverses in direction, causing the relay to operate and disconnect the feeder 2.

Impedance 6 may consist chiefly of either resistance or reactance or it may consist of combinations of these two elements and will preferably be designed to produce the same power factor as relays 7 and 8. In the event of a fault on feeder 1 the same series of events will occur but in the opposite manner, the current flowing through relay 8 increasing and that through relay 7 decreasing and then reversing by the shifting of the equipotential point in the opposite direction.

Instead of connecting the current transformers so that the potentials are in the same direction, they may be connected with the potentials in opposition and the two relays in series as indicated in Fig. 3. With this arrangement to produce a normal bias against operation, the impedance 6 may be connected in shunt as indicated.

It will be seen from the above description that my invention provides a simple method for preventing the operation of the protective apparatus on ordinary unbalancing and that by this arrangement great care is unnecessary in balancing the transformers to adjust the apparatus. The feeders to be protected need not necessarily be of the same current-carrying capacity as in cases where the system is applied to unequal feeders; the ratio of transformation in the current transformers may be modified as necessary. The figures of the drawing are merely diagrammatic and the connection of the potential coils of the relays as well as their actual construction is omitted as such arrangements are well known and form no part of my present invention. It will also be apparent that many variations in the precise connections used and the specific application of my invention to distribution systems may be made without departing from the scope of the appended claims.

What I claim as new and desire to secure by Letters Patent of the United States, is,—

1. An alternating current system of distribution comprising parallel feeders, reverse current relays associated therewith so as to disconnect one of the feeders from the system when the currents in the feeders become unbalanced by a predetermined percentage, said relays having their current coils normally excited by current flowing in the opposite direction to that which will cause the relays to operate.

2. An alternating current distribution system comprising current transformers connected to parallel feeders and having their secondary windings connected together to form a system in which current will flow, an impedance connected in said secondary system, and reverse current relays having their current coils connected to said secondary system in such a way that current normally flows through said current coils in the opposite direction to that which will cause the relays to operate.

3. An alternating current system of distribution comprising current transformers connected to parallel feeders and having their secondary windings connected together to form a system in which current will flow, an impedance connected in said secondary system, and reverse current relays having their current coils connected to said secondary system in such a way that one of the feeders will be disconnected from the system when the currents in the feeders become unbalanced by a predetermined percentage.

4. An alternating current system of distribution comprising current transformers connected to parallel feeders and having their secondary windings connected together to form a system in which current will flow, an impedance connected in said secondary system, and reverse current relays having their current coils connected to said secondary system in such a way that one of the feeders will be disconnected from the system when the currents in the feeders become unbalanced by a predetermined percentage, said current coils being normally excited by current flowing in the opposite direction to that which will cause the relays to operate.

5. An alternating current system of distribution comprising current transformers connected in parallel feeders and having their secondary windings connected together to form a system in which current will flow, and reverse current relays having their current coils connected to said secondary system in such a way that current will normally flow through said current coils in the opposite direction to that which will cause the relays to operate and will continue to flow in that direction as long as the unbalancing of the currents in the feeders does not exceed a predetermined percentage.

6. An alternating current distribution system comprising current transformers connected to parallel feeders and having their secondary windings connected together to form a system in which current will flow, and a reverse current relay controlling each of said feeders and having its current coil connected to said secondary system in such a way that current normally flows through said current coil in the opposite direction to that which will cause the relay to operate but will reverse in direction when the unbalancing of the currents in the two feeders by reason of a fault in the feeder which it controls exceeds a predetermined percentage.

7. An alternating current system of distribution comprising current transformers connected to parallel feeders and having their secondary windings connected together to form a system in which current would flow, an impedance connected in said secondary system, and a reverse current relay controlling each feeder and having its current coil connected to said secondary system in such a way that the feeder which it controls will be disconnected from the system when the currents in the feeders become unbalanced by a predetermined percentage by reason of a fault in the feeder which it controls, said current coil being normally excited by current flowing in the opposite direction to that which will cause the relay to operate.

8. Protective means for an alternating current system of distribution comprising reverse current relays associated with the system in such a way that they will operate to disconnect a portion of the system in which a fault occurs from the other portions of the system, said relays having their current coils connected in a circulating current system supplied by the secondaries of transformers connected to suitable points in the distribution system, said current coils being connected in such a way that current will normally flow therethrough in the opposite direction to that which will cause the relays to operate and will continue to flow in that direction as long as the unbalancing of the currents in the transformers does not exceed a predetermined percentage.

In witness whereof, I have hereunto set my hand this 3rd day of December, 1915.

EDMUND BASIL WEDMORE.

Copies of this patent may be obtained for five cents each, by addressing the "Commissioner of Patents, Washington, D. C."